March 10, 1959 H. J. McSKIMIN 2,877,431

TEMPERATURE-STABLE ULTRASONIC DELAY LINES

Filed May 26, 1954

INVENTOR
H. J. McSKIMIN
BY H. O. Wright
ATTORNEY

United States Patent Office 2,877,431

Patented Mar. 10, 1959

2,877,431

TEMPERATURE-STABLE ULTRASONIC DELAY LINES

Herbert J. McSkimin, Basking Ridge, N. J., assignor to Bell Telephone Laboratories, Incorporated, New York, N. Y., a corporation of New York Application May 26, 1954, Serial No. 432,363

1 Claim. (Cl. 333—30)

This invention relates to temperature-stable delay lines. More particularly, it relates to delay lines in which the delay member is cut from a single quartz crystal and has a predetermined orientation of very low, or substantially zero, temperature-delay coefficient, i. e. the transmission time of ultrasonic waves through the member is substantially independent of temperature, and the associated electromechanical transducer is also a single quartz crystal having, preferably, the same predetermined orientation, or, at least, having substantially the same coefficients of expansion with temperature, the transducer being securely bonded to the delay member by a thin layer of material, such as, for example, solder.

Prior art marker delay lines, that is delay lines which respond to a single input pulse by producing a series of evenly spaced "echo" pulses which serve as timing or marking pulses, have given trouble at extreme temperatures, in that either the bond between the delay member and the transducer or both the bond and the transducer are frequently shattered by stresses developed by unequal transverse expansion or contraction of the delay member and the transducer. Furthermore, the temperature-delay coefficients of many prior art delay lines are sufficiently large that the operation of the delay line in a temperature controlled compartment has been found necessary.

A principal object of the invention is, accordingly, to eliminate operating difficulties encountered at extreme temperatures with delay lines of the type in which a piezoelectric transducer is securely bonded to a solid delay line or member.

Another principal object of the invention is to substantially eliminate variation of delay with temperature changes in solid delay rods or lines.

A further principal object is to substantially eliminate variations of delay with changes in temperature in delay lines in which a piezoelectric transducer is securely bonded to a solid delay member.

A still further object is to provide delay lines in which a piezoelectric transducer is securely bonded to a delay member, said lines having extremely low temperature-delay coefficients and developing negligible stresses between the transducer and the delay member at extreme temperatures.

Other and further objects of the invention will become apparent during the course of the following detailed description of specific illustrative embodiments of the invention and from the appended claim.

Figure 1:
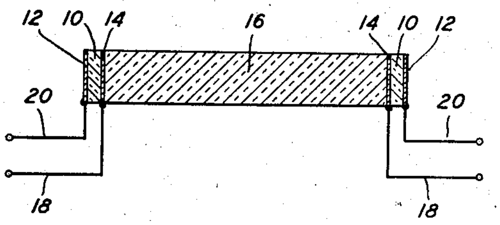
Fig. 1 illustrates a general type of delay line to which the principles of the invention are applicable.

In more detail in Fig. 1, a solid delay line or rod 16 having a very low, or substantially zero, coefficient of temperature-delay is bonded, or securely fastened, at each of its ends, to a piezoelectric transducer 10 by a thin layer 14 of solder or other suitable bonding material. In the event that a bonding material which is non-conductive is employed, a thin conductive layer or plating of conductive material is first applied directly to the adjacent or inner side of each of the transducers 10 and the transducers are then bonded to the respective ends of line 16, as shown. A thin conductive layer or plating of conductive material 12 is applied to the outer side of each of the transducers 10 and electrical leads 20 and 18 are connected to each of the terminal conductive platings 12, 14, of the transducers 10, as shown.

In the arrangement of Fig. 1, a pulse, or signal pulses, introduced into delay line 16 by one of the transducers 10, will be received by the second transducer at the other end of line 16, delayed by the time required to traverse delay line 16 from one end to the other. Devices of the invention are, by way of example, efficient for use with microwave radio frequency pulses, frequencies between 1 and 60 megacycles per second, being commonly employed.

Figure 3:
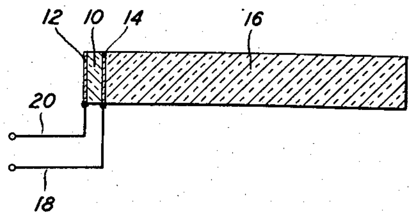
Fig. 3 illustrates another general type of delay line to which the principles of the invention are applicable.

The over-all arrangement of Fig. 1 can be readily modified, as illustrated in Fig. 3, by simply omitting one transducer and its associated bond, terminal platings and electrical leads to provide a delay line of the so-called "marker delay line" type. The "marker delay line" is most frequently employed to obtain a series of equally spaced (in time) marker pulses (or echo pulses) in response to a single input pulse, the single transducer 10 being employed both to transmit the input pulse into the line 16 and to receive the echo pulses resulting therefrom. With the "marker delay line," using a single transducer, as illustrated in Fig. 3, the first echo pulse received back at the input end of the line 16 will be delayed by the time required by the input pulse to traverse line 16 from the input to the far end and after reflection from the far end to return to the input end. Each successive subsequent echo pulse will also, obviously, be likewise delayed with respect to its immediately preceding echo pulse by twice the delay of a pulse traveling through delay line 16 in one direction only.

To achieve the objects of the present invention delay line 16 is a single unitary piece of quartz, cut from a single quartz crystal with its longitudinal axis perpendicular to a specific plane of the crystal from which it is cut. The specific plane, for the purposes of the present invention, is determined by the type of ultrasonic vibrational energy which is to be transmitted along the delay line and the directions in which the crystal has substantially a zero temperature-delay coefficient for transmission of the type of energy selected. In general either "shear" wave (transverse) or compressional wave (longitudinal) ultrasonic vibrational energy is employed.

The principal planes of a single quartz crystal are defined with respect to three axes designated X, Y and Z, commonly known as the electrical, mechanical and optical axes, respectively, whose orientations with respect to a quartz crystal with idealized natural faces are shown, by way of example, in Fig. 6.3 at page 83 of W. P. Mason's book entitled "Piezoelectric Crystals and Their Applications to Ultrasonics," published by D. Van Nostrand Co., Inc., New York city, 1950.

For transducers to propagate shear wave ultrasonic energy the preferred cuts, for the purposes of the present invention, are those known as the AT and the BT cuts, illustrated in Mason's Fig. 6.3, mentioned above, and described in detail at pages 98 and 99 of Mason's above mentioned book. Delay lines or rods of the present invention for use with AT and BT cut transducers should be cut from the single quartz crystal so that their respective longitudinal axes are perpendicular, or normal, to the AT and BT planes, respectively, as said planes are illustrated in said Fig. 6.3 of Mason's book. Such delay lines are for the purposes of the present invention designated as AT or BT cut delay lines, respectively.

To recapitulate, in the arrangement illustrated in Fig. 1, if both the transducers 10 and the delay line 16 are either AT cut or BT cut, as defined above, a delay line having a zero temperature-delay coefficient, for the transmission of shear wave ultrasonic energy, will be realized. Furthermore, since the coefficient of expansion of quartz with temperature change is appreciably different in the direction of its optic (or Z) axis as compared with its coefficient of expansion in the direction of its electrical and mechanical axes (X and Y axes, respectively) the transducer crystals, in each of the above instances (i. e. AT or BT cuts) should be oriented in the assembly of Fig. 1 with their "optic axis" (or Z axis) directions parallel to the optic axis direction of the delay line 16. When so arranged the expansion or contraction of the transducers in all lateral, or transverse (with respect to the longitudinal axis of member 16), directions with the temperature changes will be exactly the same as for the delay line 16 so that no stresses will develop between the transducers and the delay line even at extreme temperatures and consequently no difficulties will be encountered with shattered bonds or transducers, or both, even though the over-all device is subjected to very low or every high temperatures. Furthermore, since delay lines or rods of quartz of either the AT or BT cuts, as defined above, will transmit ultrasonic shear or transverse waves with a delay which is independent of the temperature of the line or rod, delay rods or lines including a transducer at one or both ends will have a zero temperature-delay coefficient and need not therefore be enclosed in temperature controlled compartments.

For transducers to propagate compressional waves, a preferred cut for each of the transducers is the X cut as illustrated in Fig. 6.3 of W. P. Mason's above mentioned book. For the delay rod or line three choices exist, any of which will have a relatively quite low temperature-delay coefficient. By way of example, a variation in the order of 18 parts in a million with normal operating temperature variations can be attained by employing such delay lines. These choices comprise a cut in which the longitudinal axis of the rod or line is parallel to the X axis of the crystal (to be referred to hereinafter as an X cut delay rod or line), a cut in which the longitudinal axis of the rod or line is parallel to the X—Y plane and at a clockwise angle of 60 degrees with respect to the X axis (to be referred to hereinafter as a +60 degree X cut delay rod or line) and a cut in which the longitudinal axis of the rod or line is parallel to the X—Y plane and at a counterclockwise angle of 60 degrees with respect to the X axis (to be referred to hereinafter as a −60 degree X cut delay rod or line). The last two mentioned cuts of delay rod or line provide substantially identical performances to the simple X cut delay rod or line mentioned above.

With any of the above three cuts of delay rod or line, the transducers employed can be of the simple X cut type as described above. The transducers should be assembled with and bonded to the delay rod or line so that the optic axis (Z axis) directions of the transducers and the associated delay rod or line are mutually parallel. The coefficients of expansion or contraction with temperature of the transducers and of the delay rod and line in all directions transverse or normal to the longitudinal axis of the delay rod or line will then be equal and no stresses sufficient to damage either the bonds or the transducers will be developed even at extremely high or low ambient temperatures.

Figure 2:
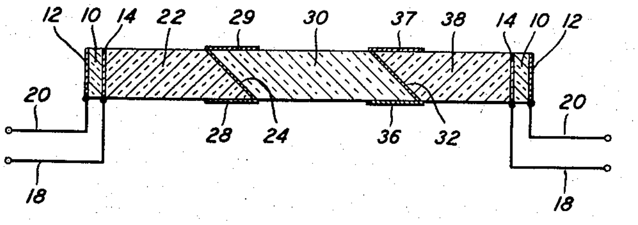
Fig. 2 illustrates one method of obtaining a delay line of the invention, composited of several individual portions to provide greater delay than can be obtained from the longest single crystal delay unit of the invention which it is practicable to obtain.

In Fig. 2 the method of constructing delay rods or lines of the invention to provide delays greater than those afforded by the longest practicable delay rod or line of any particular cut which can be obtained from a single quartz crystal is illustrated. It comprises simply cutting a plurality of individual delay rods or lines such as 22, 30, and 38 of Fig. 2 all having the same one of the above described "cuts" with reference to the principal axes of the quartz crystal from which they are cut. The several individual rods or lines are then joined together, after cutting their respective abutting ends at an acute angle, which may be, for example, 45 degrees, so that they may be firmly bonded together by a thin layer of solder or other suitable adhesive as indicated at junctions 24 and 32 of Fig. 2. For transmission from left to right in the arrangement of Fig. 2, members of absorbing material 28 and 36 are placed on the lower surface of the over-all composite delay rod or line at positions such that the small amount of energy reflected from junctions 24 and 32 will be absorbed by members 28 and 36. Members 28 and 36 can be, for example, for lead-tin-bismuth eutectic solder, or of any of numerous other materials well known by those skilled in the art as effective absorbing materials for the ultrasonic energy being transmitted through the delay line. The transducers 10, terminals 12, bonds and terminals 14 and conductive leads 18 and 20 can, of course, each be as described above for the correspondingly designated elements of Fig. 1. The "cuts" of the transducers 10 and the portions of delay rod or line 22, 30, 38 are selected as described for the delay line of Fig. 1, bearing in mind the type of ultrasonic energy which is to be transmitted through the line.

In the delay line of Fig. 2 it is also preferable to provide additional absorbing members 29 and 37 similar in all respects to 28 and 36 but placed on the upper surface of members 38 and 30 adjacent to the junctions 32 and 24, as shown, respectively, and positioned to absorb energy reflected at the junctions, respectively, either for the case in which the original energy is introduced at the right end of the line or to absorb re-reflected energy from junctions to the right of the particular junction at which the absorber is placed.

Numerous and varied other arrangements within the spirit and scope of the principles of the present invention can readily be devised by those skilled in the art. For example, delay members in the form of unitary rods or lines cut from a single quartz crystal at any of the above described predetermined orientations having a substantially zero temperature-delay coefficient can be satisfactorily used with other than quartz crystal piezoelectric transducers where the temperature range under which the delay line is to be used is not excessive. The above described arrangements are illustrative only.

What is claimed is:

A delay member for delaying ultrasonic wave energy, said member comprising a plurality of portions joined end to end, each portion being a unitary piece of a quartz crystal having its longitudinal axis normal to a particular predetermined plane of the quartz crystal from which it is cut, abutting ends of successive portions being cut at matching acute angles and energy absorbing members positioned adjacent junctions between successive portions of said delay member to absorb energy reflected by the junctions between successive portions.

References Cited in the file of this patent

UNITED STATES PATENTS

| | | |
|---|---|---|
| 1,955,471 | Pooler | Apr. 17, 1934 |
| 2,276,013 | Bohannon | Mar. 10, 1942 |
| 2,361,998 | Williams | Nov. 7, 1944 |
| 2,425,594 | Brown | Aug. 12, 1947 |
| 2,596,460 | Arenberg | May 13, 1952 |
| 2,767,336 | Arenberg | Oct. 16, 1956 |

OTHER REFERENCES

"Piezoelectric Crystals and Their Application to Ultrasonics" (Mason), published by D. Van Nostrand Co., Inc., 1950. (Copy in Scientific Library.)